P. KENNEDY.
STORAGE BATTERY CELL.
APPLICATION FILED OCT. 3, 1906.

907,372.

Patented Dec. 22, 1908.

UNITED STATES PATENT OFFICE.

PATRICK KENNEDY, OF NEW YORK, N. Y., ASSIGNOR TO CONSOLIDATED RAILWAY ELECTRIC LIGHTING AND EQUIPMENT COMPANY, OF NEW YORK, N. Y., A CORPORATION OF MAINE.

STORAGE-BATTERY CELL.

No. 907,372.   Specification of Letters Patent.   Patented Dec. 22, 1908.

Application filed October 3, 1906. Serial No. 337,234.

*To all whom it may concern:*

Be it known that I, PATRICK KENNEDY, a citizen of the United States, residing at New York, in the county of New York and State of New York, have invented certain new and useful Improvements in Storage - Battery Cells; and I do hereby declare the following to be a full, clear, and exact description of the invention, such as will enable others skilled in the art to which it appertains to make and use the same.

My improvements relate to the mechanical construction of cells for storage batteries and the like, designed, and particularly adapted, for use on moving vehicles, such as railway vehicles and motor cars. On such vehicles batteries are used as a source of power for lighting and driving purposes, and the batteries are almost of necessity placed in positions to which access is difficult and in which the available space is limited. It is, therefore, of great importance that such battery cells should be so constructed that the battery plates, and the liquid agent, if such an agent is used, may be conveniently placed in and removed from the cell, and that the largest possible proportion of the space within the cell may be effectively utilized. The movement of the vehicle, however, tends to cause splashing and spilling of the liquid in the cells, and the object of my improvements is to produce a battery in which the plates and liquid agent may be readily inserted and removed, a large proportion of the space within the cell may be effectively utilized, and which may be readily and quickly inspected at any time, since it is necessary in practice to inspect frequently the condition of the cells, and which is, nevertheless, normally covered in such manner as to prevent splashing and spilling and exclude dust and cinders.

The preferred form of my improvements is illustrated in the accompanying drawings, in which—

Figure 1:
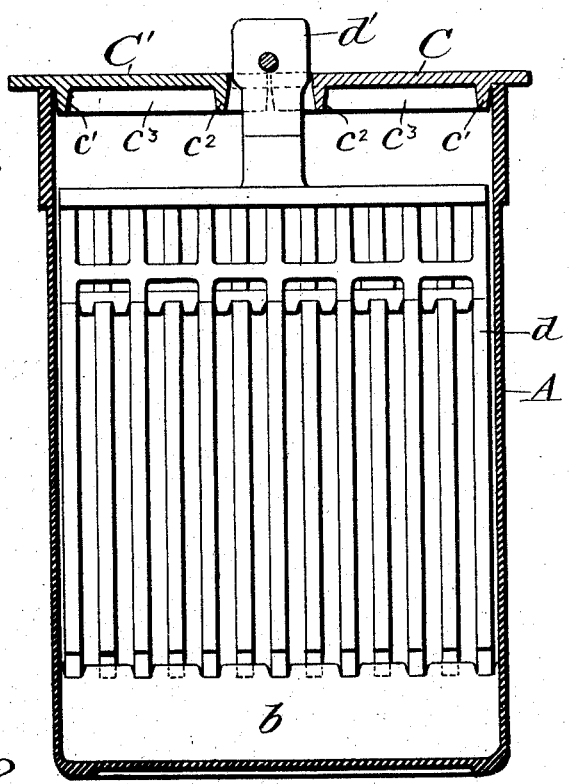
Figure 2:
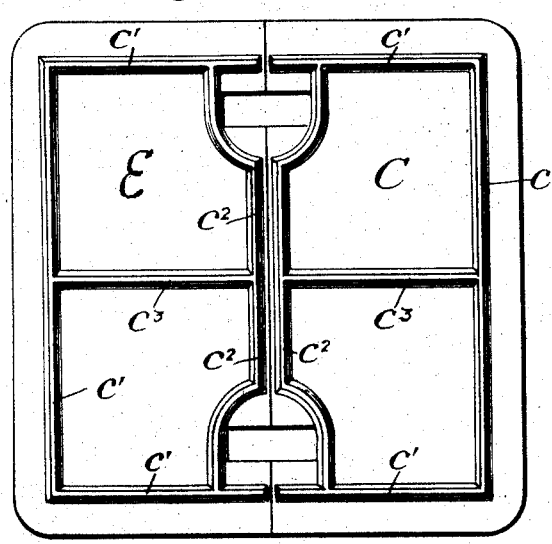
Figure 3:
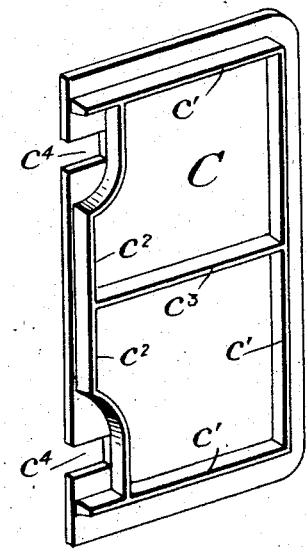

Figure 1 is a vertical section of a storage battery cell. Fig. 2 is a plan view of the underside of the cover, and Fig. 3 is a projection of one half of the cover.

The jar A may be made of glass, hard rubber, or other suitable material which is not affected by the battery acid. The jar is preferably square with straight vertical sides, and entirely open at the top, so that the battery plates $b$ may be readily inserted therein. The bottom of the cell is provided with upstanding ribs $d$ on which the lower edges of the plates rest. The negative and positive plates alternate and are provided with terminals $d'$ which project above the upper edge of the jar.

The jar is provided with a flat cover made in two similar parts C and E adapted to fit into and overlap the open upper end of the jar. Each half of the cover is provided on its under side with the depending ribs $c'$ adapted to fit closely within the opening of the jar to hold the cover in place and prevent splashing; the ribs $c^2$ curved at their ends to surround the notches $c^4$ in the cover through which the terminals project, and adapted to prevent splashing at the division line of the cover and about the terminals; and the cross ribs $c^3$ which are adapted to break up a heavy splash across the cover and thus minimize the danger of spilling.

It will be seen that with this construction of jar and cover the elements may be readily inserted and removed; the entire space within the jar is available for effective use; splashing and spilling is prevented; dust and cinders are excluded from the jar; the cover is securely held in place, and one or both halves of the cover may be quickly removed to inspect the cell and be replaced, without disturbing the terminals or connections.

What I claim as my invention is:

1. An electric battery jar having an opening at the top, a loose cover for said opening composed of two sections placed side by side, each section having a depending rib along the ends and outer side of its under surface and set back from the edge sufficiently to fit within and allow the cover to overlap the edges of the opening, and an additional depending rib along the inner side of the lower surface and in close proximity to the edge thereof, substantially as described.

2. In an electric battery, a jar, electrodes therein, terminals connected to said electrodes, and a loose divided cover resting on the upper edges of the jar having notches through which said terminals pass, whereby the cover may be removed without disturbing said terminals, substantially as described.

3. In an electric battery, a jar, electrodes therein, terminals connected to said electrodes, a loose divided cover resting on the upper edges of the jar having notches through which said terminals pass, whereby the cover may be removed without disturbing said terminals, and depending ribs on the under surface of said cover surrounding the notches to prevent splashing therethrough, substantially as described.

4. An electric battery jar comprising a bottom and sides and open at the top, terminals projecting above the top of the jar, a loose cover made in two parts resting on and overlapping the upper edges of the jar, each part of the cover having a depending rib along the ends and outer sides of its under surface set back from the edge and adapted to fit within the top of the jar, notches on the inner sides adapted to fit around the terminals, and a depending rib along the inner side of the under surface in close proximity to the edge thereof and curved around the notches, substantially as described.

5. An electric battery jar comprising a bottom and sides and open at the top, terminals projecting above the top of the jar, and a loose cover made in two parts resting on and overlapping the upper edges of the jar, each part of the cover having the depending ribs $c^1$, $c^2$ and $c^3$ and the notches $c^4$, substantially as described.

In testimony whereof I affix my signature, in presence of two witnesses.

PATRICK KENNEDY.

Witnesses:
 AUG. TREADWELL, Jr.,
 WILLIAM H. DAVIS.